July 13, 1965   L. E. HERZMARK ETAL   3,193,982
APPARATUS FOR EVACUATING AND SEALING BAGS
Filed April 12, 1961   5 Sheets-Sheet 1

INVENTORS
LEONARD E. HERZMARK &
BY EDGAR M. LIEBERMAN
Fishburn and Gold
ATTORNEYS

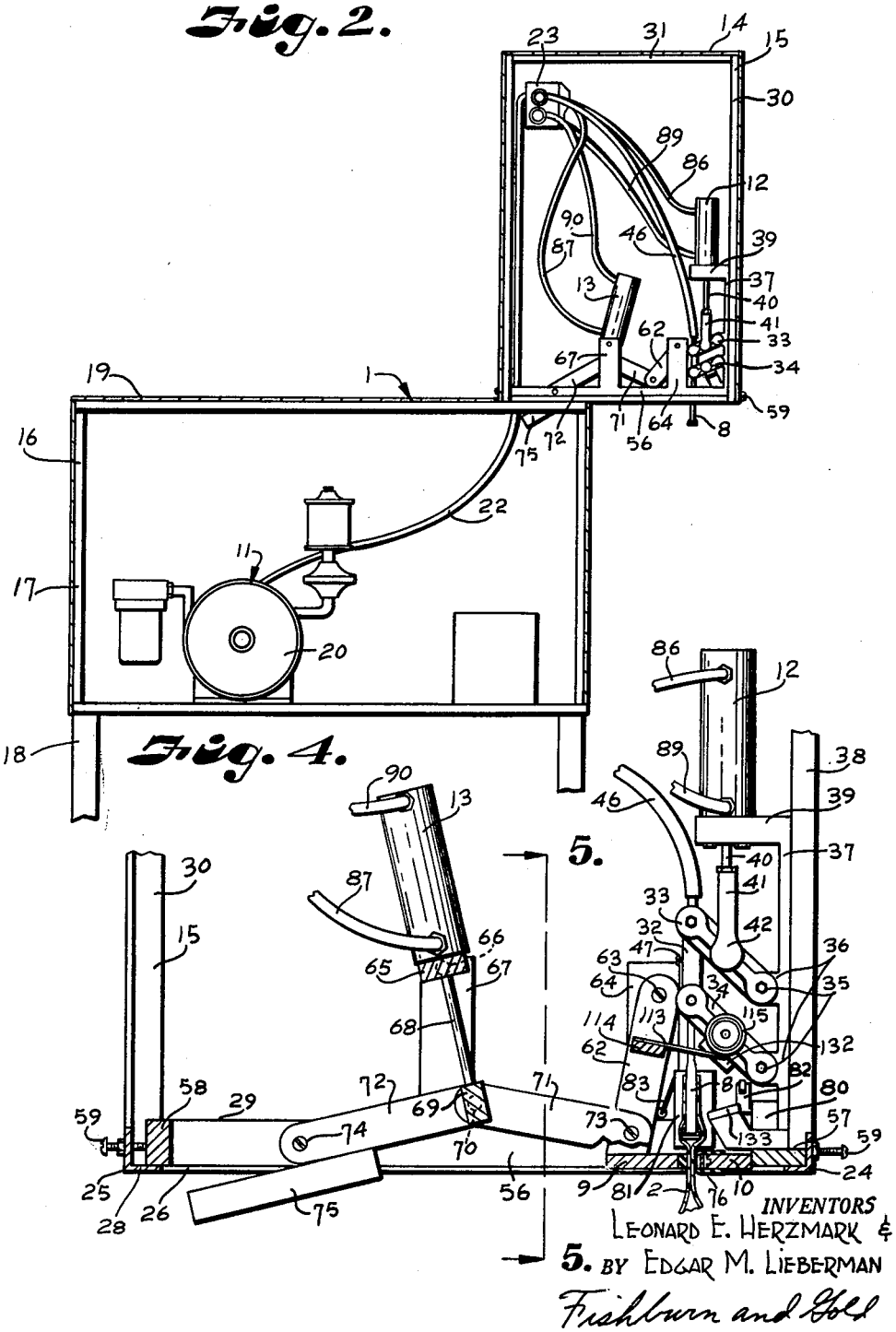

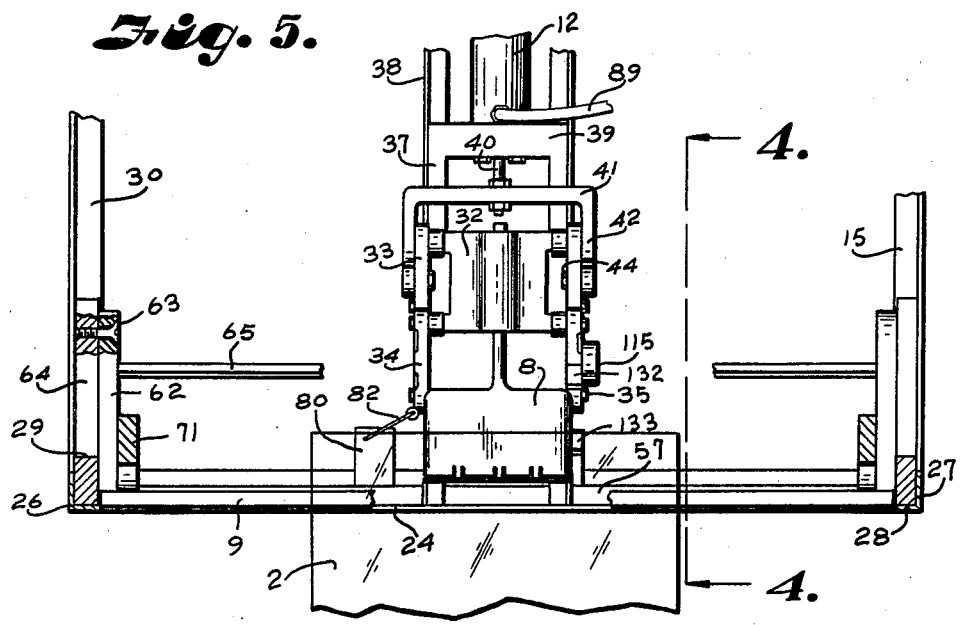
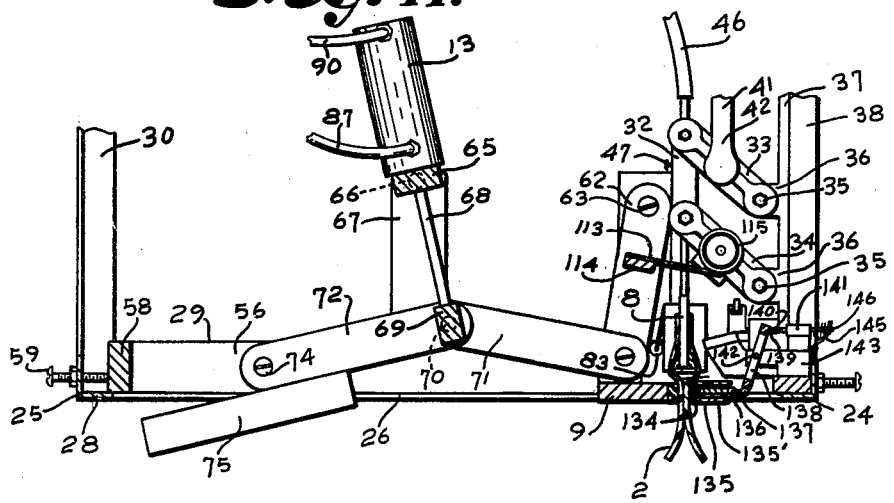

July 13, 1965    L. E. HERZMARK ETAL    3,193,982
APPARATUS FOR EVACUATING AND SEALING BAGS
Filed April 12, 1961    5 Sheets-Sheet 4
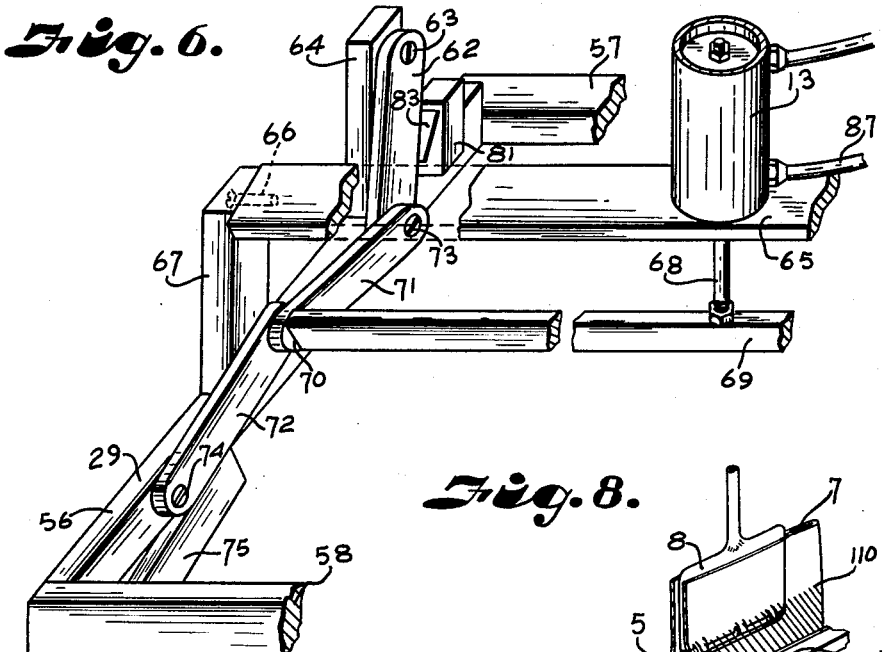
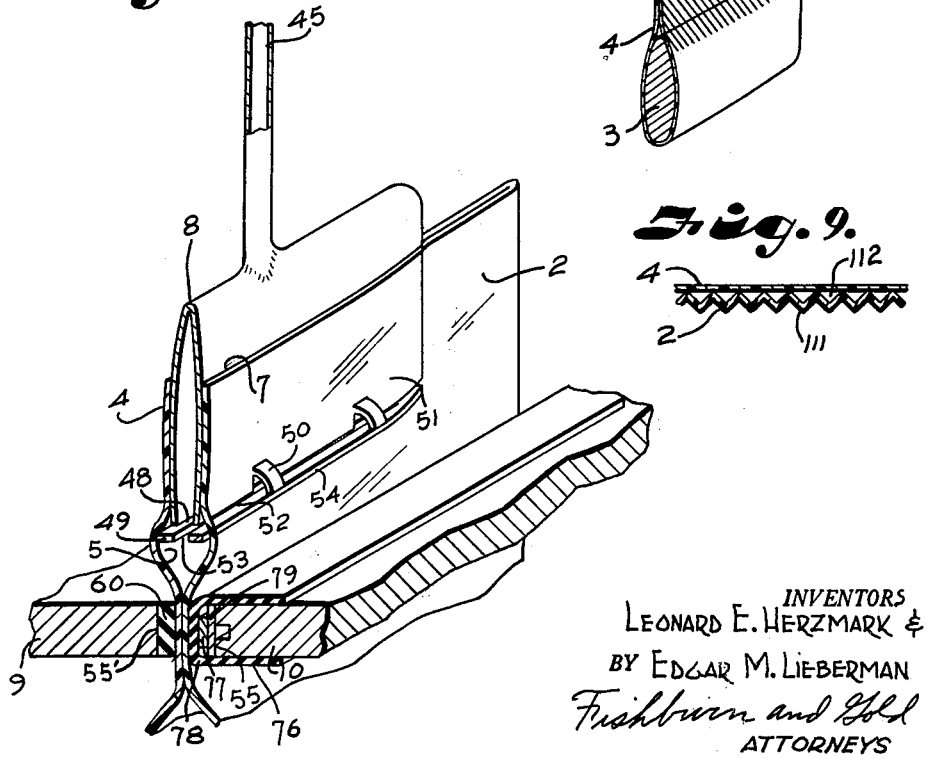
INVENTORS
LEONARD E. HERZMARK &
BY EDGAR M. LIEBERMAN
Fishburn and Gold
ATTORNEYS

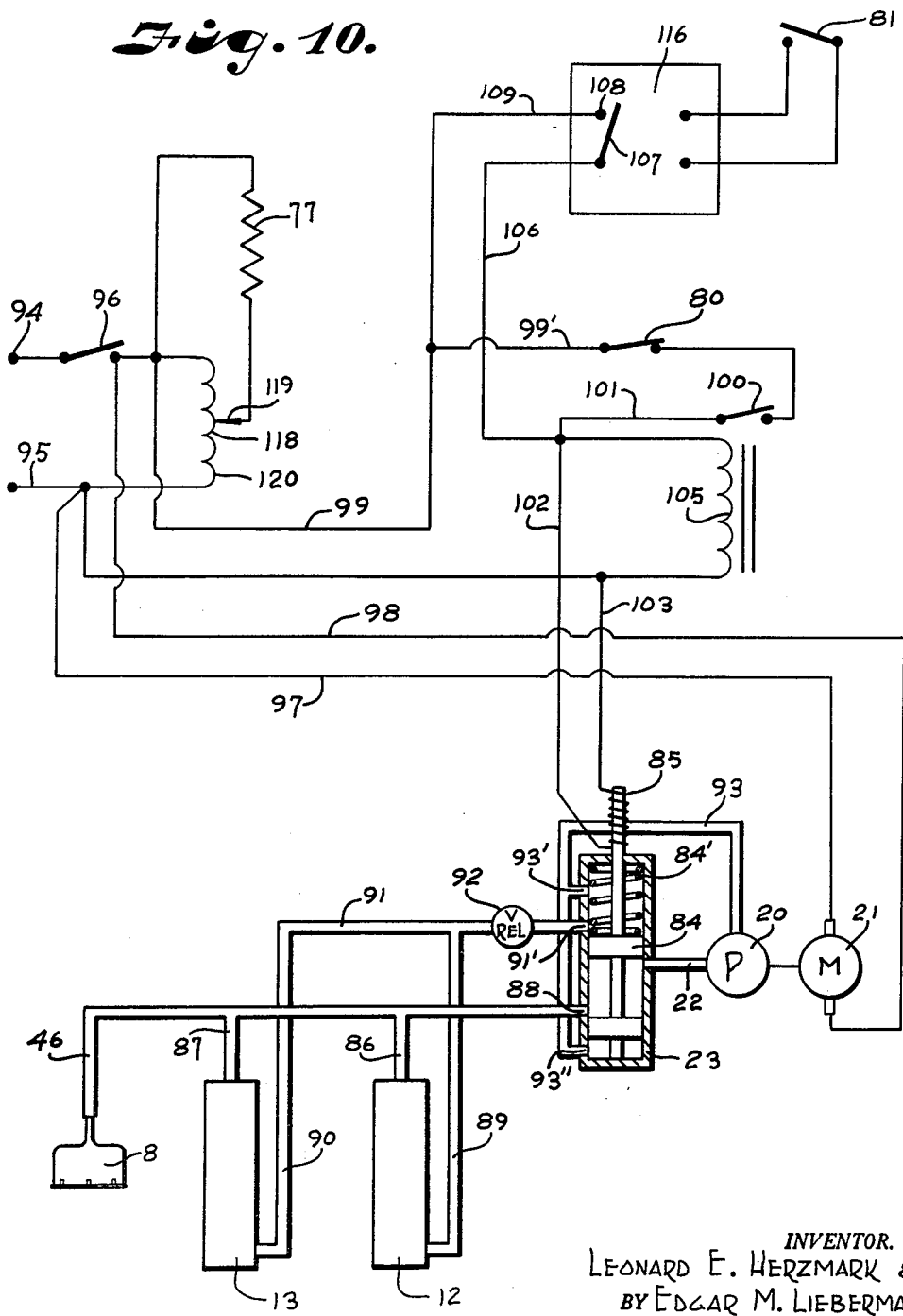

United States Patent Office 3,193,982
Patented July 13, 1965

3,193,982
APPARATUS FOR EVACUATING AND
SEALING BAGS
Leonard E. Herzmark, Johnson County, Kans., and Edgar
M. Lieberman, Jackson County, Mo., assignors to Dura-
Lee Corporation, Kansas City, Kans., a corporation of
Missouri
Filed Apr. 12, 1961, Ser. No. 102,569
11 Claims. (Cl. 53—112)

This invention relates to the sealing of collapsible bags, and more particularly to a novel apparatus for evacuating and sealing heat sealable collapsible bags with articles of merchandise or commodities therein.

The principal objects of the present invention are to provide apparatus for evacuating and sealing thermoplastic or thermoplastic coated flexible bags wherein the mouth of the bag need only be sleeved over an evacuating nozzle and evacuation of the bag initiates sealing of the bag; to provide such an apparatus with a novel suction system wherein the same source of suction may be utilized to evacuate the bag containing a product, transport the bag or portion thereof and product during movement to a sealing position, actuate jaws during sealing, and to release the sealing jaws and bag after sealing is completed; to provide such an apparatus wherein sealing jaws engage the bag during sealing between the nozzle and article contained in the bag to support the bag during sealing for separation of the portion of the bag from the seal to the nozzle; to provide such an apparatus for sealing article containing thermoplastic bags or thermoplastic coated bags having smooth inner surfaces adjacent the mouth for engagement in flattened formation and with the nozzle and elongate deformities defining minute channels extending from the nozzle to the article for effecting complete evacuation of the bag when collapsed between the article and nozzle, and gripping means to grip the channelled portion between the article and nozzle adjacent an area to be sealed to hold the bag portions at the seal in smooth condition while sealing means becomes effective to join the contiguous faces adjacent said gripping means and thus seal the bags; to provide such an apparatus wherein an evacuating nozzle is mounted for substantially vertical movement from a bag receiving position to a bag sealing position and movably mounted sealing jaws operable to engage the bag when in sealing position with power means responsive to sub-atmospheric pressures for effecting movement of the nozzle and jaws, and an electric circuit with switches actuated in response to movement of the nozzle and jaws for controlling the sealing of the bag and the application of the sub-atmospheric pressure to the power means; and to provide an apparatus for evacuating and sealing bags that is efficient, safe, relatively inexpensive, yet positive for rapidly and sequentially evacuating and sealing of article containing heat sealable bags.

Other objects and advantages of this invention will become apparent from the following description taken in connection with the accompanying drawings wherein are set forth by way of illustration and example certain embodiments of this invention.

FIG. 2 is a side elevation of the evacuating and sealing apparatus with the housing broken away to illustrate the arrangement of the parts therein.

FIG. 4 is a vertical sectional view through the apparatus similar to FIG. 3 and with the parts positioned for sealing of the evacuated bag taken on the line 4—4, FIG. 5.

FIG. 5 is a vertical transverse sectional view through the apparatus taken on the line 5—5, FIG. 4.

FIG. 6 is an enlarged detail perspective view of the sealing jaw supporting and moving structure.

FIG. 7 is an enlarged detailed partial perspective view of a nozzle, jaws and bag in sealing position, with portions broken away to illustrate the structure of the parts.

FIG. 8 is a partial perspective view of an article containing bag on the evacuating nozzle and sealing jaws and particularly showing deformations in the bag walls to form channels.

FIG. 9 is a partial sectional view through the bag walls in collapsed position between the nozzle and article with one of the bag walls shaped to form minute channels.

FIG. 10 is a diagrammatic view of the electrical circuit and suction system.

FIG. 11 is a vertical sectional view through a modified form of apparatus wherein a heat sealing bar is relatively movable with respect to the sealing jaws.

Figure 1:
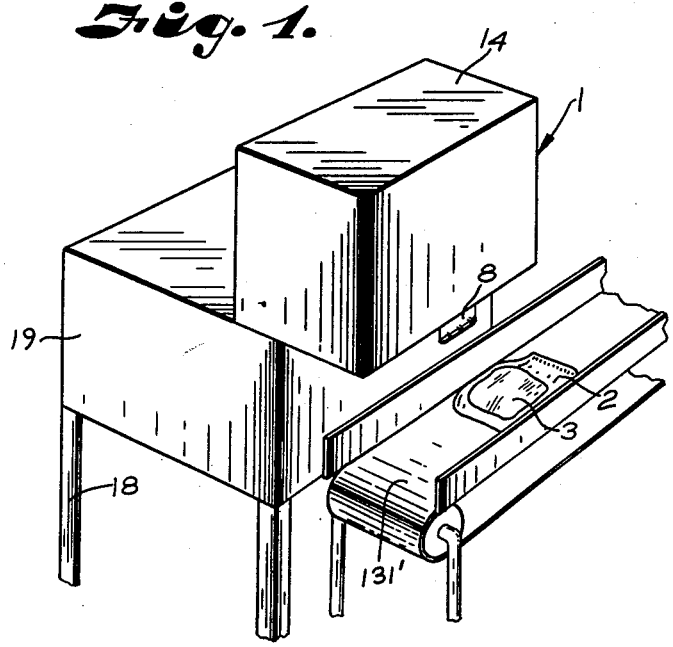
FIG. 1 is a perspective view of an apparatus for evacuating and sealing bags with a conveyor for moving the sealed bags therefrom.

Referring more in detail to the drawings:

The numeral 1 generally designates apparatus for evacuating and sealing bags 2 containing articles or commodities 3 wherein the walls 4 of the bag are flexible with inner surfaces 5 of thermoplastic or heat sealable material, particularly in the area 6 to be sealed, said area being spaced from the mouth 7 of the bag. The apparatus 1 generally includes an evacuating nozzle 8 adapted to be received within the mouth 7 of the bag 2, sealing jaws 9 and 10, suction apparatus 11 and suction power mechanisms 12 and 13 responsive to sub-atmospheric pressures arranged to cooperate whereby application of a bag to be evacuated and sealed to the nozzle initiates the operation wherein the bag is evacuated and is then moved and held during sealing operations. In the structure illustrated, the operating mechanism is enclosed in a housing 14 carried on a frame 15 preferably mounted on a suitable support or base 16 whereby a portion of the frame 15 extends outwardly or forwardly from the base, as illustrated in FIG. 2. The housing 14 preferably covers the top, sides and ends of the frame 15, the bottom of the housing being open. While the base may be any suitable support, in the illustrated structure it includes a frame 17 carried on legs 18 with a suitable housing 19 covering the frame 17 to form an enclosure for the source of suction 11, for example, a pump 20 driven by a suitable device such as an electric motor 21, said pump having its intake connected to a suction line 22 leading to a valve 23 for controlling the application of the suction, as later described.

The frame 15 is preferably formed of structural shapes, such as angle iron or the like, and includes a lower portion having spaced front and rear members or bars 24 and 25 connected at their ends by rails 26 and 27 having lower horizontal legs 28 extending inwardly to provide guides for movably mounting a jaw carrying frame 29. The frame 15 has spaced upright members 30 with their upper ends connected by headers 31 to form a rigid structure.

It is preferred that the bag be moved by the nozzle 8 from an evacuating to a sealing position where the portion of the bag to be sealed is between sealing jaws. This may be a horizontal, angular or vertical movement as desired. In the machine illustrated, the nozzle extends below the frame 15 and housing 14 for ease of application of a bag before movement to an upper or sealing position. In the illustrated structure, the nozzle is moved vertically, said nozzle is adjustably mounted on a carrier 32 which is pivotally mounted at one end of spaced parallel links 33 and 34 which have their other ends pivotally mounted as at 35 on ears 36 of a support member 37 that is fixed to spaced upright frame members 38 that extend from the lower frame member 24 to the header 31 thereabove whereby the nozzle is preferably near the front of the frame and substantially midway between the ends thereof. The support member 37 has an inwardly extending bracket or arm 39 spaced above the parallel link 33 and a suction power mechanism 12 is carried on said bracket. The power mechanism preferably is an extensible means or double-acting pneumatic ram operable under sub-atmospheric pressure with a piston rod 40 extending therefrom and having an end secured by suitable fastening devices to a yoke 41 with ends 42 straddling the link 33 and pivotally connected as at 44 intermediate the ends of said link whereby operation of the ram effects up and down swinging movement of the parallel links 33 and 34 to move the carrier 32 and the nozzle 8 therewith. In the illustrated structure, the nozzle includes a tubular duct 45 that extends upwardly through the carrier with the upper end extending therefrom and connected to a suction line 46 leading to the valve 23. A suitable fastening device 47 such as a set screw holds the duct 45 in the carrier.

Figure 3:
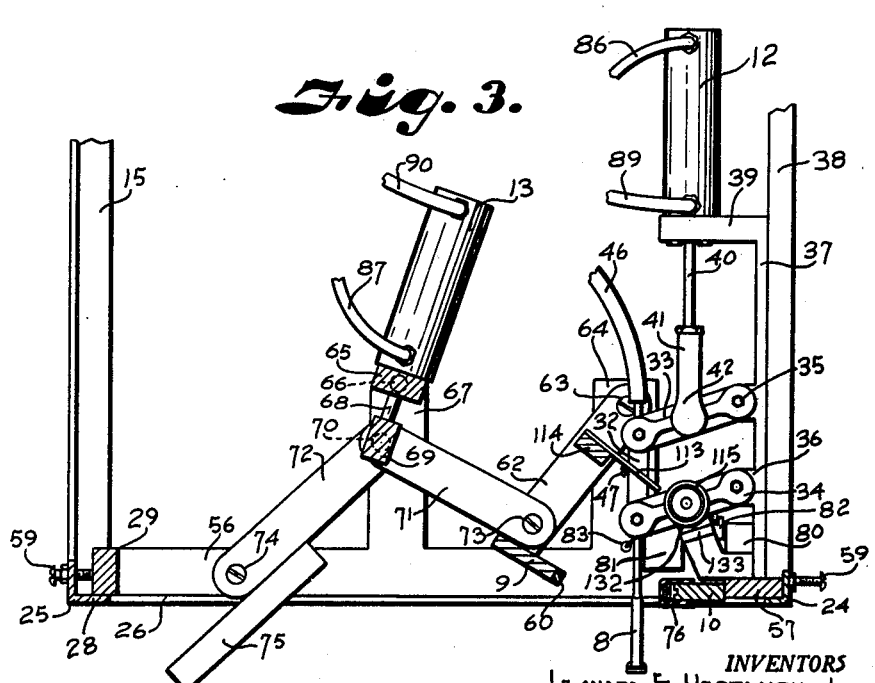
FIG. 3 is a vertical sectional view through the sealing apparatus showing the evacuating apparatus, the parts being shown in position for receiving a bag to be sealed.

The nozzle 8 is hollow and preferably elongate with its lower end having an elongate slot or opening 48 wtih a plate member 49 secured to fingers 50 extending outwardly and downwardly from the side walls 51 of the nozzle whereby the plate is spaced below the lower end of the nozzle to provide lateral inlet slots or openings 52 below the lower end of said nozzle and the portion of the bag at the nozzle inlets is held away from closing relation to the nozzle openings to assure air being drawn from the bag by the suction. The plate 49 also has an elongate slot 53 therein substantially registering with the slot 48 whereby air can pass therethrough. The plate 49 is of greater width than the lower end of the nozzle body whereby the side edges 54 will engage the walls of a bag applied thereto to hold same separated at the nozzle inlet and assure air passing from the bag into the nozzle. The nozzle is arranged with the slots 48 and 53 preferably parallel to the forward lower frame member 24 whereby the upper portion of the bag when flattened will be substantially in a vertical plane extending between the ends of the frame 15. The lower end of the nozzle 8 preferably extends below the frame 15 when in bag receiving position, as illustrated in FIG. 3, whereby a bag may be applied to the nozzle by sleeving the mouth portion of the bag over said nozzle with the mouth of the bag still below the frame 15. Also, the arrangement of the parallel links 33 and 34 is as illustrated in FIG. 3, and, when the nozzle is moved to its upper or sealing position, the links are positioned as illustrated in FIG. 4 with the angle between said links and the horizontal being much greater than in the lowered position whereby in the upward position the bag is positioned forwardly in the frame from its lowered position. In the upper or sealing position, the movement of the bag forwardly in the frame moves the forward wall of the bag below the nozzle into engagement with a face 55 of the jaw 10 which extends longitudinally of the frame and is carried by the jaw carrying frame structure 29, said jaw carrying frame structure having end members 56 connected by longitudinal members 57 and 58 that are supported on the inwardly extending flanges or legs of the lower frame members 24, 25, 26 and 27. Adjusting devices such as adjusting screws 59 are mounted in the frame members 24 and 25 and adapted to engage the movable frame members 57 and 58 to effect movement thereof forwardly and rearwardly relative to the frame 15 to adjust the jaw position 10 whereby its inner face 55 will engage the bag when in sealing position. It is preferable that a resilient cushion strip 60 be applied to the clamping face 55' of the jaw 9 to cooperate with the face 55 of the jaw 10 and provide a gripping action on the bag, accommodate different thicknesses of bag walls and, also, it is preferable that the cushion member be of suitable resilient material coated or otherwise of a character so that it tends to not adhere to the bag during sealing. Such material may be silicone rubber.

The sealing jaws 9 and 10 are preferably opposed and on opposite sides of the bag and relatively movable whereby they are spaced on opposite sides of the nozzle when in evacuating position and are moved to engage the bag on the nozzle in an area between the nozzle and the article in the bag when in sealing position. It is preferred that one of the jaws 9 and 10 be stationary and the other movable. In the illustrated structure, the sealing jaw 10 is in fixed position relative to the jaw carrying frame 29 which, in turn, is held in adjusted position by the adjusting members or screws 59. The clamping and sealing jaw 9 is carried on the lower ends of arms 62 which have their other ends pivotally mounted as at 63 on upstanding posts 64 of the jaw carrying frame 29, whereby the jaw 9 may be moved toward and away from the jaw 10. The arms 62 are swung by a suction power mechanism 13 which, in the illustrated structure, is an extensible member such as a pneumatic ram responsive to subatmospheric pressures. The ram is mounted on a beam 65 that has trunnions or bearing members 66 at the ends rotatably mounted in posts 67 upstanding from the end members 56 of the jaw carrying frame and rearwardly spaced from the posts 64. The ram 13 is preferably double acting and has a piston rod 68 fixed to a bar 69 that has ends pivotally mounted as at 70 on trunnions which form pivotal connections of adjacent ends of toggle links 71 and 72, the other ends of the toggle links 71 being pivotally connected as at 73 to the portion of the arms 62 adjacent the jaw 9 and the other ends of the links 72 are pivotally connected as at 74 with the end members 56 of the movable or jaw carrying frame. A counter-balance weight 75 may be secured to the links 72 to facilitate retractive movement of the jaw 9 from the jaw 10. Extension of the ram or suction mechanism 13 swings the links 71 and 72 and tends to straighten same to a position as illustrated in FIG. 4 to engage the jaw 9 with the side wall of the bag on the opposite side from the jaw 10, and contractive movement of the ram swings the links 71 and 72 to retract the jaw 9 into the position illustrated in FIG. 3.

A heat sealing member 76 which may be of suitable conventional structure wherein heat is applied to the bag for a period of time to effect a heat seal of the portions clamped between the jaws is carried by one of the jaws and preferably by the stationary jaw 10. The sealing element or member may be any suitable heat sealing device and it may be of the impulse sealer type wherein a heater element or strip 77 is secured to the jaw member 10 and insulated therefrom. It is preferable that a thin layer of release material 78 be the bag contacting face of the jaw over the heater element and, also, it is preferable that an insulating member 79 be mounted behind the sealing element 77, to provide electrical and heat insulation when necessary. The layer of release material 78 may be tetrafluorethylene or the like. A suitable circuit for electrically energizing the heater element and for the suction includes electrical switches 80 and 81, the switch 80 preferably being carried on the support 38 and positioned whereby the switch actuating arm 82 is engaged by the lower parallel link 34 to move same to circuit-breaking position when the nozzle is in its lowered position. The switch 81 is preferably carried on an end member 56 of the movable frame 29 and has a switch actuating arm 83 positioned to be engaged by an arm 62 when the jaws 9 and 10 are in bag sealing position.

The valve 23 which controls the application of suction is preferably electrically operated and may be of any suitable structure. In the illustrated structure, the valve member 84 is spring-biased by a spring 84' for movement in one direction and is moved by a solenoid coil 85 in the opposite direction. The suction line 46 and the lines 86 and 87 from the suction power means 12 and 13 respectively are connected for communication through a port 88 of the valve. The lines 89 and 90 of the suction power mechanisms 12 and 13 respectively are connected for communication through a line 91 to a port 91' in the valve. A relief valve 92 is in the line 91, said valve opening to atmosphere to vent air from pump and prevent pressure being produced in said line 91 and forcing power means to retract, said valve closing when pressure in line 91 drops below atmospheric and thereby allows a suction or vacuum to be drawn in said line 91 by the pump as later described. In normal position, when the solenoid coil 85 is de-energized, the valve member 84 provides for communication between the lines 46, 86 and 87 to the suction line 22 of the pump 20. The discharge of the pump 20 is connected by a line 93 to ports 93' and 93" of the valve 23 and in normal position of the valve member 84 the discharge of the pump is through line 93, port 93', port 91' and valve 92 to atmosphere, and lines 89 and 90 also vent through valve 92 to atmosphere. When the coil 85 is energized, the valve member is moved to its other position wherein the lines 89 and 90 communicate with the suction line 22 leading to the pump and the lines 46, 86 and 87 communicate through the port 88, valve 23, port 93" with the pump discharge line 93 whereby air from the pump blows out through the nozzle.

The electric circuit includes leads 94 and 95 from a suitable source of electric current, for example 110 volts, and there is a main switch 96 which, when in circuit-making position, completes a circuit through conductors 97 and 98 connecting the motor 21 with the leads 94 and 95 respectively whereby the motor drives the pump 20 to apply a suction through the line 22 to the valve 23. When the nozzle is in its lowered position, as illustrated in FIG. 3, the link 34 engages the switch arm 82 of the switch 80 to hold same in circuit-breaking position. The solenoid coil 85 is in a circuit which includes lead 94 connected through the conductor 99, branch 99', to switches 80 and 100 in series, then through conductor 101 and conductor 102 to the solenoid coil 85 and conductor 103 to the lead 95. A holding coil 105 is connected across the conductors 102 and 103 and when coil 105 is connected across the conductors 102 and 103 and when energized maintains the switch 100 in circuit-making position. The holding coil 105 is also connected by a conductor 106 with a timer switch arm 107 having a contact 108 connected by a conductor 109 back to the conductor 99 whereby energization of the coil 85 is maintained even though the switch 107 is moved to circuit-interrupting position until the link 34 moves the switch 80 to interrupt the circuit to the holding coil 105 to allow the switch 100 to open.

With the apparatus in the positions illustrated in FIG. 3, the suction power rams or mechanisms 12 and 13 do not respond as the nozzle is opened so that there is insufficient suction applied to the rams to move the pistons therein. When a bag is sleeved over the nozzle, the movement of air into the nozzle openings draws the smooth inner faces of the bag adjacent the nozzle into engagement with the nozzle and, also, flattens the mouth portion of the bag so that the bag at the mouth collapses together and in engagement with the nozzle to prevent entry of air into the bag. Then the suction of the pump draws the air from the bag to evacuate same. It is preferred that at least one of the side walls of the bag be provided with small or minute deformations or channels extending from above the lower end of the nozzle as at 110 (FIG. 8) to below the article 3 in the bag, and thereby even when the sides of the bag between the nozzle and article tend to collapse together, the channels or deformations 111 provide minute channels 112 for passage of air to the nozzle to assure complete evacuation of the bag. When the bag has been substantially evacuated, the suction causes a sub-atmospheric pressure to be applied to the rams 12 and 13 to contract the ram 12 to swing the parallel links 33 and 34 upwardly, moving the carrier 32 and the nozzle and the bag which is held on the nozzle by the suction upwardly, to sealing position. Simultaneously, the suction applied through the suction line 87 to the ram 13 tends to extend same to move the jaws into bag engaging position, but the movement of the jaws is delayed by a finger 113 fixed on a bar 114 connecting the arms 62 with the finger arranged to engage an abutment in the form of a roller 115 carried on one side of one of the arms 34, the finger 113 riding under the roller as the arms 34 are swung upwardly with the nozzle 8, thereby preventing the jaws from engaging the bag until after the lower end of the nozzle is above the jaws 9 and 10, as illustrated in FIG. 4. The actuation of the rams 12 and 13 and movement of the apparatus is initiated by the placing of the bag on the nozzle and the bag being evacuated. When the nozzle is moved to its upper or sealing position, the ram 13 effects movement of the jaw 9 to engage the bag between the jaws 9 and 10 and, as the jaws reach their sealing position, one of the arms 62 actuates a suitable mechanism either mechanical or electrical for controlling the time of application of heat by the heater element 77. It is preferable that movement of the nozzle or carriage therefor actuates a suitable timer, either mechanical or electrical, for controlling the time of application of heat to the bag, and in the illustrated structure one of the arms 62 engages a switch arm 83 of the switch 81 to effect operation of a timer 116.

In the electrical circuit illustrated, voltage is applied to the heater element 77 in the fixed jaw through an auto-transformer 118 and the voltage is variable by varying the position of a tap 119 on the winding 120 of the transformer.

When a bag is sleeved over the nozzle 8, suction created by the pump 20 acts through the line 46, port 88, valve 23 and line 22 and draws the mouth of the bag closed around the nozzle. Exhausting of air from the bag and closure of the nozzle by the bag causes the pump to form a sub-atmospheric pressure in lines 86 and 87 to actuate same retracting the nozzle and moving the jaws to engage the bag therebetween. This action also closes the operating switch 81 to start the timer which at the end of a predetermined time closes the switch 107 completing a circuit to the holding coil 105 closing switch 100 and also energizing coil 85. The coil 85 being energized effects movement of the valve member 84 to a position wherein the discharge of the pump is through line 93, port 93", port 88 and line 46 to blow air through the nozzle and the bag therefrom, the suction of the pump 20 through the valve 23 to port 91' and lines 89 and 90 retracting the jaws and lowering the nozzle. As soon as the jaws are retracted or reset, the timer switch 81 opens but the relay switch 100 and normally closed switch 80 continue to maintain a circuit for current through the holding coil 105 and valve coil 85. At the end of the return stroke of the jaw carrying members and lowering of the nozzle, the mechanism connected with the nozzle 8 moves the switch 80 to open position de-energizing holding coil 105 and valve coil 85 whereby the valve member 84 returns to connect the suction of the pump with the nozzle and the machine is reset for the next cycle. When the circuit to the coil 85 is completed the valve member 84 will move to apply the suction through the suction lines 89 and 90 to the rams 12 and 13 respectively and, also, provide for communication of the discharge of the pump 20 with the other ends of the rams and the nozzle to blow air through said nozzle. This breaks the suction holding the bag to the nozzle and blows the bag from the nozzle in a positive separation while the suction to the ram 13 starts retracting the jaw 9. The suction also is applied to the ram 12 tending to extend same to move the nozzle downwardly; however, the downward movement of the nozzle is delayed by engagement of the roller 115 with the finger 113 whereby the nozzle cannot move downwardly until after the jaws are separated sufficiently for the nozzle to pass therebetween. The sealing member may be such that it will sever the bag immediately above the jaws or the seal at the jaws, and then the sealed bag will drop from between the jaws, and it is preferred that the sealed article containing bag drop onto a conveyer 131' to carry it to a suitable destination. As the jaw 9 is retracted, the finger 113 allows the roller 115 to move thereby whereby the nozzle is lowered and, as it reaches its lowermost position, a link 34 engages the arm 82 of the switch 80 to reset the circuits and effect de-energization of the solenoid coil 85 to move the valve member 84 to again apply suction to the nozzle and the rams 12 and 13. However, this will merely draw air through the nozzle until the next article containing bag is applied thereto and the next cycle started by the application of the bag to the nozzle.

It is preferred that the movement of the nozzles 8 and the jaw 9 be delayed until after the air is exhausted from a bag engaged on the nozzle and a predetermined subatmospheric pressure is attained in the bag. This is provided by a magnet 132 on a movable part of the nozzle mounting and a ferrous metal member 133 on a stationary part of the mounting to hold them against relative movement until a predetermined force is developed by suction in the ram 12. In the illustrated structure, a permanent magnet 132 is supported on an arm 34 and a ferrous metal plate or armature 133 is supported in fixed relation on the frame member 57 in a position to be engaged by the magnet 132 when the nozzle 8 is in lowered position as in FIG. 3. This does not change the operation of the remainder of the structure except to provide a holding force to hold the arm 34, carriage 32 and nozzle 8 in bag receiving or lowered position until the suction in the ram overcomes such force. That requires a predetermined sub-atmospheric pressure in the ram and also in the bag and thereby assures a desired evacuation of the product containing bag.

In the form of the invention illustrated in FIG. 11, the stationary jaw is arranged to support a heating element or bar 134 therein, and movable relative thereto with operating mechanism whereby the heat sealing bar is moved into sealing engagement with the bag for a short period of time to effect the seal and then retracted. In the structure illustrated, the jaw 135 has spaced portions 135' to provide spaced clamping engagement with the bag to clamp the bag between said portions and the movable jaw 9. The heating element 134 is slidable therebetween and is carried by a plate which has its rear portion pivotally connected as at 136 to an arm 137 pivotally carried by one end of a lever 138 with the other end of the lever having a link 139 with an end pivotally connected as at 140 with the solenoid 141 carried by a bracket 143 carried by the frame member 57. The lever 138 is pivotally mounted as at 142 to the bracket 143 and a spring 145 on the bracket engages the armature of the solenoid whereby said armature 146 is urged in a position to retract the heating element 134 from sealing position and energization of the solenoid effects movement of the lever and the arms to move the heating bar into sealing position. The heating bar, lever and solenoids are all carried by the same structure so that the heating element is moved into sealing position and back while the jaws are in bag clamping position. The remainder of the structure and the operation are the same as described in the form of the invention illustrated in FIGS. 1 to 10 inclusive.

It is to be understood that while we have illustrated and described certain forms of our invention, it is not to be limited to the specific forms or arrangements of parts herein described and shown except insofar as such limitations are included in the claims.

What we claim and desire to secure by Letters Patent is:

1. A suction system for operating bag evacuating and heat sealing apparatus having sealing jaws and an evacuating nozzle to remove air from an article containing bag before sealing comprising, an evacuating nozzle adapted to extend through an unsealed margin of a bag, means supporting said nozzle for movement between an evacuating position and a sealing position, sealing jaws, means movably supporting said sealing jaws for movement from a spaced relation to a sealing position wherein said jaws engage a bag therebetween adjacent to and spaced from the nozzle when said nozzle is in sealing position, suction power mechanism operatively connected with said nozzle supporting means and said jaw supporting means for effecting movement of same, a suction source connected with the evacuating nozzle and with said suction power mechanism for actuating said suction power mechanism to effect a subatmospheric pressure therein to move the nozzle supporting means and bag to sealing position only when an unsealed margin of a bag is sleeved over the evacuating nozzle and engaged therewith and said bag collapsed in response to evacuation thereof terminating a source of air to the nozzle and thereafter to move jaw supporting means and sealing jaws to sealing position, and cooperating means on the nozzle supporting means and jaw supporting means for retaining the sealing jaws in open position until the nozzle is moved.

2. Apparatus for evacuating and heat sealing article containing bags comprising, an evacuating nozzle to remove air from an article containing bag before sealing, said nozzle being elongate with smooth opposed sides connected at opposed ends defining a hollow structure with a slot at the inlet, a plate member at the inlet of said nozzle and supported from the sides thereof in spaced relation to define lateral inlet slots, said plate extending laterally from the sides of said nozzle, a suction source connected with an evacuating nozzle extending through an unsealed margin of a bag and terminating spaced relation from an article in the bag for evacuating said bag to collapse same and hold said margins on said nozzle, normally spaced sealing jaws, a suction power mechanism connected to said jaws to move same into engagement with said bag, passageways connecting said nozzle and said suction power mechanism with said suction source, and means operable to effect communication through said passageways for evacuating the bag and in response to subatmospheric pressure in said passageways actuating said suction power mechanism to move the jaws into engagement with said bag.

3. A suction system for operating bag evacuating and heat sealing apparatus having sealing jaws and an evacuating nozzle to remove air from an article containing bag before sealing comprising, a suction source connected with an evacuating nozzle extending through an unsealed margin of a bag and terminating in spaced relation from a article in the bag for evacuating said bag to collapse same and hold said margins on said nozzle, said nozzle being positioned between sealing jaws with a bag receiving portion extending therefrom, a suction power mechanism connected to said nozzle for bodily moving said nozzle and article containing bag relative to said jaws to position the jaws between the nozzle and article, a second suction power mechanism connected to said jaws to move same into engagement with said bag between the nozzle and article therein, passageways connecting said nozzle and first and second-named suction power mechanism with said suction source, a valve means in said passageways and operable to effect communication through said passageways for evacuating the bag and in response to subatmospheric pressure in said passageways actuating said suction power mechanism to move the nozzle and bag and then move the jaws into engagement with said bag, and cooperative means connected to said nozzle and jaws to restrict movement of the jaws until said nozzle has moved from therebetween and thereby prevent the jaws from contacting the portion of the bag having the nozzle therein.

4. A suction system for operating bag evacuating and heat sealing apparatus having sealing jaws and an evacuating nozzle to remove air from an article containing bag before sealing comprising, an evacuating nozzle adapted to extend through an unsealed margin of a bag, said nozzle being elongate with smooth opposed sides connected at opposed ends defining a hollow structure with a slot at the inlet, a plate member at the inlet of said nozzle and supported from the sides thereof in spaced relation to define lateral inlet slots, said plate extending laterally from the sides of said nozzle, sealing jaws, means movably supporting said sealing jaws from a spaced relation to a sealing position wherein said jaws engage a bag therebetween adjacent to and spaced from the nozzle, suction power mechanism operatively connected with said jaw supporting means for effecting movement of same, a suction source connected with the evacuating nozzle and with said suction power mechanism for actuating said suction power mechanism when an unsealed margin of a bag is sleeved over the evacuating nozzle and engaged therewith and said bag collapsed in response to evacuation thereof terminating a source of air to the nozzle whereby the suction source effects a sub-atmospheric pressure in said suction power mechanism to move the jaw supporting means, a heating element in a sealing jaw, and an electrical circuit connected to said heating element for energizing and controlling the application of energy to the bag in effecting sealing of the bag.

5. A suction system for operating bag evacuating and heat sealing apparatus having sealing jaws and an evacuating nozzle to remove air from an article containing bag before sealing comprising, an evacuating nozzle adapted to extend through an unsealed margin of a bag, said nozzle being elongate with smooth opposed sides connected at opposed ends defining a hollow structure with a slot at the inlet, a plate member at the inlet of said nozzle and supported from the sides thereof in spaced relation to define lateral inlet slots, said plate extending laterally from the sides of said nozzle, means supporting said nozzle for movement between an evacuating position and a sealing position, sealing jaws, means movably supporting said sealing jaws for movement from a spaced relation to a sealing position wherein said jaws engage and clamp a bag therebetween adjacent to and spaced from the nozzle when said nozzle is in sealing position, suction power mechanism operatively connected with said nozzle supporting means and said jaw supporting means for effecting movement of same, a suction source connected with the evacuating nozzle and with said suction power mechanism for actuating said suction power mechanism when an unsealed margin of a bag is sleeved over the evacuating nozzle and engaged therewith and said bag collapsed in response to evacuation thereof terminating a source of air to the nozzle whereby the suction source effects a sub-atmospheric pressure in said suction power mechanism to move the nozzle supporting means and jaw supporting means, means cooperating with the suction power mechanism for sequential movement of the nozzle and sealing jaws, a heating element in a sealing jaw, an electrical circuit connected to said heating element for energizing same, and control means including a switch actuated by movement of said jaws to control the application of heat to the sealing jaws in effecting sealing of the bag.

6. A suction system for operating bag evacuating and heat sealing apparatus having sealing jaws and an evacuating nozzle to remove air from an article containing bag before sealing comprising, a suction source connected with an evacuating nozzle extending through an unsealed margin of a bag and terminating in spaced relation from an article in the bag for evacuating said bag to collapse same and hold said margins on said nozzle, said nozzle being positioned between spaced sealing jaws with a bag receiving portion extending therefrom, a suction power mechanism connected to said nozzle for bodily moving said nozzle and article containing bag relative to said jaws to position the jaws between the nozzle and article, a second suction power mechanism connected to said jaws to move same into engagement with said bag, passageways connecting said nozzle and first and second-named suction power mechanism with said suction source, a valve means in said passageways operable to effect communication through said passageways to draw air through the nozzle until a bag is moved to position with the nozzle extending into same and with surrounding unsealed bag margins engaging said nozzle to initiate evacuating the bag and then in response to sub-atmospheric pressure in said passageways actuating said suction power mechanism to move the nozzle and bag to sealing position and move the jaws into engagement with said bag, cooperative means connected to said nozzle and jaws to restrict movement of the jaws until said nozzle has moved from therebetween so that the jaws are prevented from contacting the portion of the bag having the nozzle therein, a heating element in said sealing jaw, an electrical circuit connected to said heating element for energizing same, and control means actuated by movement of said jaws to control the application of heat to the bag in effecting sealing thereof.

7. An apparatus for air evacuating and sealing article containing bags having smooth inner surfaces defining the mouth thereof and thermoplastic flexible portions defining inner surfaces in inwardly spaced relation to said smooth inner surfaces, walls of said bags having inner surfaces with minute channels extending from said smooth surfaces defining the mouth to beyond an article in said bag when said walls are in collapsed condition, said apparatus comprising, an evacuating nozzle for receiving the mouth of an article containing bag sleeved thereover with the inner end of said nozzle extending beyond the smooth inner surfaces of the bag in communication with the portion having the minute channels in spaced relation to the article, means supporting said nozzle for movement between an evacuating position to a sealing position, opposed jaws on opposite sides of said nozzle in its evacuating position, means movably supporting said jaws for movement from a spaced relation to a sealing position wherein said jaws engage and grip the bag across the width thereof between the nozzle and the article when the nozzle is in sealing position, a source of suction, means connecting said source of suction to said nozzle for evacuating a bag applied thereto, the minute channels in the inner surfaces of said bag walls providing air passages for movement of air from bag portions around the article to the nozzle after collapse of the wall portions between the article and nozzle in response to such evacuation, means connected to said jaw supporting means permitting movement of said jaws to sealing position only after a predetermined sub-atmospheric pressure is attained in said bag, a heating element in at least one of said jaws, and means controlling the application of energy to said heating element to effect sealing of the bag portion gripped between said jaws.

8. An apparatus for air evacuating and sealing article containing bags having smooth inner surfaces defining the mouth thereof and thermoplastic flexible portions defining inner surfaces in inwardly spaced relation to said smooth inner surfaces, walls of said bags having inner surfaces with minute channels extending from said smooth surfaces defining the mouth to beyond an article in said bag when said walls are in collapsed condition, said apparatus comprising, an evacuating nozzle for receiving the mouth of an article containing bag sleeved thereover with the inner end of said nozzle extending beyond the smooth inner surfaces of the bag in communication with the portion having the minute channels in spaced relation to the article, means supporting said nozzle for movement between an extended evacuating position and a retracted position, a suction power means having operative connection with the nozzle supporting means for effecting retractive movement of said nozzle, opposed jaws on opposite sides of said nozzle in its extended position and relatively movable to engage and the bag across the width thereof between the nozzle and the article contained in the bag when the nozzle is in retracted position, a second suction power means having operative connection with said jaws for effecting movement thereof, a source of suction, means connecting said source of suction to said nozzle and said first and second-named suction power means to operate said suction power means to move the nozzle to its retracted position only after a predetermined sub-atmospheric pressure is attained in said bag and then move the jaws into bag engaging and gripping position, the minute channels in the inner surfaces of said bag walls providing air passages for movement of air from bag portions around the article to the nozzle after collapse of the wall portions between the article and nozzle in response to evacuation by said source of suction connected to the nozzle, cooperative means connected relative to said nozzle and jaws to restrict movement of the jaws until said nozzle has moved from therebetween, a heating element in at least one of said jaws, an electrical circuit connected to said heating element for energizing same, and control means actuated by movement of said jaws to control the application of heat to the bag in effecting sealing thereof in the portion gripped between said jaws.

9. An apparatus for air evacuating and sealing article containing bags provided with thermoplastic flexible portions defining inner surfaces adapted to be heat sealed in spaced relation to smooth inner surfaces defining the mouth thereof comprising, an evacuating nozzle adapted to have the mouth of an article containing bag sleeved thereover to position the inner end of the nozzle in spaced relation to such article, means supporting said nozzle for movement between an extended evacuating position and a retracted position, a suction power means having operative connection with the nozzle supporting means for effecting movement of said nozzle, opposed jaws on opposite sides of said nozzle in its extended position and realtively movable to engage and grip the bag between the nozzle and the article contained in the bag when the nozzle is in retracted position, a second suction power means having operative connection with said jaws for effecting movement thereof, a source of suction, means connecting said source of suction to said nozzle and said first and second-named suction power means to operate said suction power means to move the nozzle to its retracted position only after a predetermined sub-atmospheric pressure is attained in said bag and then move the jaws into bag engaging position, cooperative means connected relative to said nozzle and jaws to restrict movement of the jaws until said nozzle has moved from therebetween, a heating element in at least one of said jaws, an electrical circuit connected to said heating element for energizing same, means to control the application of heat to the bag in effecting sealing thereof, and valve means operated by said electrical circuit after completion of the sealing of the bag for communicating the nozzle with the atmosphere and alter the pressure in the suction power means to move the jaws from engagement with the bag and release the bag from the nozzle and move the nozzle to its extended position.

10. An apparatus for air evacuating and sealing article containing bags provided with thermoplastic flexible portions defining inner surfaces adapted to be heat sealed in spaced relation to smooth inner surfaces defining the mouth thereof wherein said bag has walls with inner surfaces shaped to define minute channels extending from said smooth surfaces defining the mouth to beyond an article contained in said bag when said walls of the bag are in collapsed position comprising, an evacuating nozzle adapted to have the mouth of an article containing bag sleeved thereover to position the inner end of the nozzle at the area having the channels therein and in spaced relation to such article, means supporting said nozzle for movement between an extended evacuating position and a retracted position, a suction power means having operative connection with the nozzle supporting means for effecting movement of said nozzle, opposed jaws on opposite sides of said nozzle in its extended position and relatively movable to engage and grip the bag between the nozzle and the article contained in the bag when the nozzle is in retracted position, a second suction power means having operative connection with said jaws for effecting movement thereof, a source of suction, means connecting said source of suction to said nozzle and said first and second-named suction power means to operate said suction power means to move the nozzle to its retracted position only after a predetermined sub-atmospheric pressure is attained in said bag and then move the jaws into bag engaging position, cooperative means connected to said nozzle and jaws to restrict movement of the jaws until said nozzle has moved from therebetween, a heating element in at least one of said jaws, an electrical circuit connected to said heating element for energizing same, control means actuated by movement of said jaws to control the application of heat to the bag in effecting sealing thereof, and valve means operated by said electrical circuit after completion of the sealing of the bag for communicating the nozzle with the atmosphere and alter the pressure in the suction power means to move the jaws from engagement with the bag and release the bag from the nozzle and move the nozzle to its extended position.

11. An apparatus for air evacuating and sealing article containing bags provided with heat sealable flexible portions defining inner surfaces adapted to be heat sealed in spaced relation to smooth inner surfaces defining the mouth thereof comprising, an evacuating nozzle adapted to have the mouth of an article containing bag sleeved thereover to position the inner end of the nozzle in spaced relation to such article, means supporting said nozzle for movement between an extended evacuating position and a retracted position, a suction power means having operative connection with the nozzle supporting means for effecting movement of said nozzle, opposed jaws on opposite sides of said nozzle in its extended position and relatively movable to engage and grip the bag between the nozzle and the article contained in the bag when the nozzle is in retracted position, a second suction power means having operative connection with said jaws for effecting movement thereof, a source of suction having an intake and an air discharge, means connecting said intake of the source of suction to said nozzle and said first and second-named suction power means to operate said suction power means to move the nozzle to its retracted position only after a predetermined sub-atmospheric pressure is attained in said bag and then move the jaws into bag engaging position, cooperative means connected relative to said nozzle and jaws to restrict movement of the jaws until said nozzle has moved from therebetween, means for heating at least one of said jaws, means controlling the application of heat to the bag in effecting sealing thereof, and valve means operable after completion of the sealing of the bag for communicating the nozzle with the pump discharge to blow the bag from the nozzle and alter the pressure in the suction power means to move the jaws from engagement with the bag and move the nozzle to its extended position.

References Cited by the Examiner
UNITED STATES PATENTS

| | | | |
|---|---|---|---|
| 2,335,738 | 11/43 | Casey | 53—112 |
| 2,749,686 | 6/56 | Lorenz et al. | 53—112 X |
| 2,838,894 | 6/58 | Paikens et al. | 53—79 |
| 2,840,964 | 7/58 | Kissling | 53—112 X |
| 2,863,267 | 12/58 | Moore | 53—112 X |
| 2,888,792 | 6/59 | James | 53—79 |

FRANK E. BAILEY, *Primary Examiner.*

ROBERT E. PULFREY, TRAVIS S. McGEHEE,
*Examiners.*